United States Patent Office 2,892,831
Patented June 30, 1959

2,892,831
MONOAZO TRIAZINE DYESTUFFS

William Elliot Stephen, Manchester, England, assignor to Imperial Chemical Industries Limited, London, England, a corporation of Great Britain No Drawing. Application November 23, 1956
Serial No. 623,760

Claims priority, application Great Britain
November 25, 1955

10 Claims. (Cl. 260—153)

This invention relates to new monoazo dyestuffs and more particularly it relates to new monoazo dyestuffs which are valuable for the production of fast yellow to orange colourations on cellulosic materials.

In United Kingdom specification No. 209,723 there is described the manufacture of azo dyestuffs by synthesising azo dyestuffs containing one or more cyanuric nuclei, (1) by uniting together or with other suitable components by reactions which lead to the formation of azo dyestuffs, intermediate products containing one or more cyanuric nuclei, or (2) by uniting azo dyestuffs containing appropriate groupings either to each other or to other complexes, radicals or suitable residues by reaction with the halogen of cyanuric halides. In the said specification there are disclosed monazo dyestuffs wherein there is attached to the triazine ring one chlorine atom and which are obtained in one case by reacting one molecular proportion of cyanuric chloride with two molecular proportions of the dyestuffs obtained by the reduction of the nitro group of the dyestuff, itself made by coupling diazotised 1-amino-4-nitrobenzene-2-sulphonic acid with 1-phenyl-3-methyl-5-pyrazolone, and in another case by coupling 2 molecular proportions of diazotised aniline with the secondary condensation product from one molecular proportion of cyanuric chloride and two molecular proportions of 1-(3'-amino)-phenyl-5-pyrazolone-3-carboxylic acid.

In United Kingdom specification No. 515,066 there is disclosed a disazo dyestuff wherein one chlorine atom is attached to the triazine ring which is obtained by coupling two molecular proportions of diazotised 4-sulpho-2-amino-benzoic acid with one molecular proportion of the secondary condensation product from one molecular proportion of cyanuric chloride and 2 molecular proportions of 1-(3'-amino-phenyl)-3-methyl-5-pyrazolone.

In United Kingdom specification No. 486,660 there are disclosed several azo dyestuffs each of which contains a triazine ring to which is attached one chlorine atom and one residue of an aminoazo dyestuff derived from a pyrazolone intermediate.

There is no monoazo dyestuff disclosed in any of these specifications however which contains attached to the triazine ring, in addition to two atoms of chlorine, the residue of an aminoazo dyestuff derived from a pyrazolone intermediate.

It has now been found that certain new monoazo dyestuffs containing attached to a triazine ring two chlorine atoms and the residue of an amino derivative of a 4-benzeneazo-1-phenyl-3-methyl, 3-carboalkoxy or 3-carboxy-5-pyrazolone, and which contain at least two solubilising groups of the type $SO_3H$ or $COOH$, are superior to any dyestuff disclosed in the United Kingdom specifications above-mentioned especially for application to cellulosic materials by a process which comprises treating the said textile materials with the dyestuff in aqueous solution and previously, simultaneously or subsequently subjecting the textile material to the action of an acid binding agent, inasmuch as the new monoazo dyestuffs are more soluble in water, show less tendency to gel therein and the dyeings so obtained therewith are more effectively fixed on the cellulosic textile materials.

According to the invention, therefore, there are provided as new monoazo dyestuffs, the compounds of the formula:

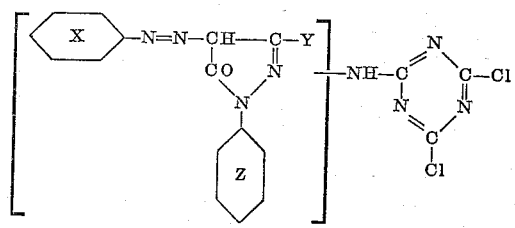

wherein the cyanuric residue is attached in the meta- or para-position either to the azo group attached to the benzene nucleus X or to the nitrogen atom attached to the benzene nucleus Z, wherein Y stands for a methyl, a carboalkoxy or a carboxylic acid group, wherein the molecule contains at least two solubilising groups and wherein the benzene nuclei X and Z may also contain further substituents other than hydroxyl groups.

Those new monoazo dyestuffs containing the cyanuric residue attached to one of the meta positions of the benzene nuclei X and Z are preferred since, in general, they give greener shades than those containing the cyanuric residue attached to one of the para positions.

According to a further feature of the invention there is provided a process for the manufacture of new monoazo dyestuffs which comprises reacting at least one molecular proportion of cyanuric chloride with a monoaminoazo compound of the formula:

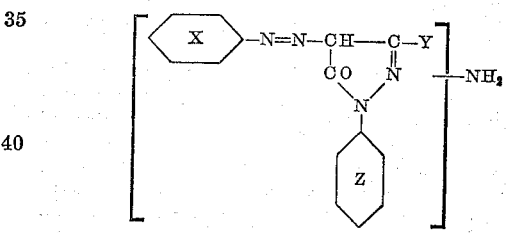

wherein the amino group is attached in meta or para position either to the azo group attached to the benzene nucleus X or to the nitrogen atom attached to the benzene nucleus Z, wherein the molecule contains at least two solubilising groups, and wherein X, Y and Z have the meanings stated above, or by coupling a diazonium compound of the benzene series with a 1-phenyl-3-methyl-, carboalkoxy-, or carboxy-5-pyrazolone wherein either the diazonium compound or the pyrazolone coupling component contains in the benzene ring, in meta or para position to the attached nitrogen atom, a 3:5-dichloro-2:4:6-triazinylamino group and wherein either benzene ring may be substituted other than with hydroxyl or amino groups and the diazonium compound and the pyrazolone coupling component are so chosen that the resultant dyestuff molecule contains at least two solubilising groups.

Thus in one process for the manufacture of the new monoazo dyestuffs, at least one molecular proportion of cyanuric chloride is reacted with a monoaminoazo compound of the above formula.

The monoaminoazo compounds of the above formula used in the said process and in which the amino group is in the benzene nucleus X, may be obtained by diazotising an aromatic primary monoamine of the benzene series containing a nitro group or an acylamino group meta or para to the amino group and which may be further substituted otherwise than by hydroxyl, nitro or acylamino groups, and coupling the product with a 5-pyrazolone containing a methyl, carboalkoxy or carboxylic acid group in the 3 position and a phenyl radical in the 1 position, which phenyl may be further substituted otherwise than by hydroxyl, amino, nitro or acylamino groups and reducing the nitro compound, or hydrolysing the acylamino compound so obtained, the aromatic primary amine and the pyrazolone being so chosen that the aminoazo compound so obtained contains at least two solubilising groups.

As examples of suitable aromatic primary monoamines which may be used, there may be mentioned for example, m- and p-nitroaniline, 4-nitroaniline-2-sulphonic acid, 3-nitroaniline-6-sulphonic acid, m- or p-aminoacetanilide, 4-aminoacetanilide-3-sulphonic acid, 3-aminoacetanilide-4-sulphonic acid and 4-amino-2-acettoluidide-5-sulphonic acid.

As examples of suitable 5-pyrazolones which may be used, there may be mentioned for example: 1-(4'-sulphophenyl)-3-methyl-5-pyrazolone, 1-(6'-chloro-3'-methyl-4'-sulphophenyl)-3-methyl-5-pyrazolone, 1-(2':5'-dichloro-4'-sulphophenyl)-3-methyl-5-pyrazolone, 1-(2'-methyl-5'-sulphophenyl)-3-methyl-5-pyrazolone, 1-(2'-chloro-5'-sulphophenyl)-3-methyl-5-pyrazolone, 1-(4'-chloro-2'-sulphophenyl)-3-methyl-5-pyrazolone, 1-(2'-chloro-4'-methyl-5'-sulphophenyl)-3-methyl-5-pyrazolone, 1-(6'-chloro-4' - sulpho - 2' - methylphenyl) - 3 - carboethoxy - 5 - pyrazolone, 1-(6'-chloro-4'-sulpho-2'-methylphenyl)-3-methyl-5-pyrazolone, 1-(4-methyl-2'-sulphophenyl)-3-methyl-5-pyrazolone, 1 - (2':5' - disulphophenyl) - 3 - methyl - 5-pyrazolone, 1-(4'-ethoxy-2'-sulphophenyl)-3-methyl-5-pyrazolone, 1-(2':4'-dichloro-5'-sulphophenyl)-3-methyl-5-pyrazolone, 1-(6'-chloro-3'-sulpho-2'-methylphenyl)-3-methyl-5-pyrazolone, 1-(4'-sulphophenyl)-3-carboxy-5-pyrazolone, 1-(3':5'-disulphophenyl)-3-methyl-5-pyrazolone, 1-(4'-carboxyphenyl)-3-methyl-5-pyrazolone, 1-(3'-carboxyphenyl) - 3 - methyl - 5 - pyrazolone, 1 - (2' - carboxyphenyl) - 3 - methyl - 5 - pyrazolone, 1 - phenyl - 3-carboxy-5-pyrazolone and 1-p-tolyl-3-carboxy-5-pyrazolone.

The aminoazo compounds of the above formula with the amino group in the benzene nucleus Z may be obtained by diazotising a primary aromatic monoamine of the benzene series not containing hydroxyl and coupling the product with a 1-(3'- or 4'-aminophenyl)-5-pyrazolone containing a methyl, carboalkoxy or carboxylic acid group in the 3 position, wherein the phenyl nucleus may also be further substituted otherwise than by hydroxyl or amino.

As examples of the primary aromatic monoamines of the benzene series which may be used there may be mentioned, for example, orthanilic acid, 2:5-disulphoaniline, 4-methyl-2-sulphoaniline, 5-chloro-4-methyl-2-sulphoaniline, 4-chloro-5-methyl-2-sulphoaniline, 5-methoxy-2-sulphoaniline, sulphanilic acid and 2:5-dichloro-4-sulphoaniline, and as examples of aminophenyl-5-pyrazolones which may be used, there may be mentioned, for example, 1-(3'-aminophenyl)-3-methyl-, carboxy-, and carboethoxy - 5 - pyrazolones, 1 - (4' - aminophenyl) - 3 - methyl-, carboxy-, and carboethoxy-5-pyrazolones and 1-(4'-amino-3'-carboxyphenyl)-3-methyl-5-pyrazolone.

A modified process for the manufacture of the new monoazo dyestuffs which contain the cyanuric residue attached to benzene nucleus Z of the above formula comprises reacting at least one molecular proportion of cyanuric chloride with a 1-(3'- or 4'-aminophenyl)-5-pyrazolone as defined above, and coupling the product with a diazotised aromatic primary monoamine of the benzene series not containing hydroxyl, the aminophenyl-5-pyrazolones and the aromatic primary monoamines being so chosen that the monoazo dyestuff obtained contains at least two solubilising groups.

As examples of the aromatic primary monoamines and the aminophenyl-5-pyrazolones which may be used in this process there may be mentioned, for example, the compounds stated above in the process for obtaining amino-azo compounds of the formula stated above wherein the amino group is attached to the benzene nucleus Z.

A modified process for the manufacture of the new monoazo dyestuffs wherein the cyanuric residue is attached to the benzene nucleus X of the above formula comprises reacting cyanuric chloride with one molecular proportion of an m- or p-phenylene-diamine which may optionally be further substituted otherwise than with hydroxyl or amino groups, diazotising the product so obtained and coupling the diazonium compound with a 1-phenyl-5-pyrazolone containing a methyl, carboalkoxy group or carboxylic acid group in the 3 position, wherein the phenyl ring may be further substituted otherwise than by hydroxyl or amino groups the phenylenediamine and the pyrazolone coupling component being so chosen that the monoazo dyestuff obtained contains at least two solubilising groups.

As examples of the phenyl-5-pyrazolones used in this process there may be mentioned, for example, the 5-pyrazolones stated above in the process for obtaining aminoazo compounds of the formula stated above wherein the amino group is attached to the benzene nucleus X.

As examples of the phenylenediamines which may be used in this process, there may be mentioned, for example, 2-sulpho-1:4-phenylenediamine, 6-sulpho-1:3-phenylenediamine and 2:4-diaminotoluene-5-sulphonic acid.

In carrying out the said processes of the invention wherein cyanuric chloride is reacted with an aminoazo compound, with a phenylene diamine or with an aminophenyl-5-pyrazolone, the reactions are preferably carried out in aqueous medium at temperatures between 0° C. and 5° C., preferably in the presence of an acid-binding agent for example sodium carbonate which is added in such a manner that the pH of the reaction mixture remains below 7; in general a slight excess of cyanuric chloride up to 10% by weight over the molecularly equivalent weight is desirable. In carrying out the processes of the invention wherein a diazotised aromatic amine is coupled with a pyrazolone coupling component, the diazotisation of the amine and the coupling of the diazo compound thus produced with the pyrazolone derivative is preferably carried out at a temperature below 5° C., conveniently at 0–5° C. In such couplings of the invention wherein the diazotised amine or the pyrazolone derivative contains the cyanuric residue it is advantageous to carry out the couplings at a temperature below 5° C., conveniently at 0–5° C., and at as low a pH as is consistent with efficient coupling in order that side reactions, for example hydrolysis of the chlorine atoms remaining attached to the cyanuric residue, are minimised.

It is generally preferable to isolate the dyestuffs from the media in which they have been formed, within a range of pH from 6 to 8 in order that removal of chlorine from the cyanuric residues by hydrolysis may be kept down to a minimum and to dry the resultant dyestuff pastes at relatively low temperatures for example between 20° C. and 45° C. and preferably in the presence of buffering agents suitable for maintaining a pH value of about 6.5. Examples of such buffering agents are mixtures of disodium hydrogen phosphate and sodium dihydrogen phosphate or of disodium hydrogen phosphate and potassium dihydrogen phosphate.

The new dyestuffs of this invention in the form of their alkali metal salts are soluble in water and may be used to colour silk, wool, regenerated protein and cellulosic textile materials for example cotton, linen and viscose rayon, by treating the textile material with an aqueous solution (which may be a thickened printing paste) of the dyestuff in conjunction with a treatment with an acid-binding agent, for example sodium hydroxide, potassium phosphate or sodium carbonate. The treatment with the acid-binding agent may be carried out prior to, simultaneously with or after the treatment with the dyestuff.

The new dyestuffs may also be applied to silk, wool, regenerated protein, polyamide and modified polyacrylonitrile textile materials, by the conventional dyeing methods used for those textile materials, that is by dyeing from weakly acid or neutral dyestuff solutions, for example dyestuff solutions containing acetic acid, formic acid, sodium sulphate or ammonium acetate.

The dyestuffs may also be applied to silk, wool and regenerated protein textile materials by the conventional printing methods used for those materials.

The yellow to orange shades so produced possess a high degree of fastness to light and to wet treatments especially to repeated washing.

The invention is illustrated but not limited by the following examples in which the parts and percentages are by weight:

Example 1

A solution of 49.7 parts of the disodium salt of the monoazo compound obtained by coupling diazotised aniline - 2:5 - disulphonic acid with 1 - (3' - aminophenyl) - 3 - methyl - 5 - pyrazolone in 1600 parts of water is added gradually during a period of 1 hour at a temperature between 0° C. and 5° C. to a suspension formed by pouring a solution of 18.6 parts of cyanuric chloride in 100 parts of acetone into a stirred mixture of 400 parts of water and 400 parts of crushed ice. The mixture is then stirred for about 30 minutes after the addition of the aminoazo compound is complete and in order to isolate the product the mixture is then neutralised by adding a solution of 5.3 parts of sodium carbonate in 50 parts of water during about 20 minutes at such a rate that the aqueous medium does not become alkaline to litmus at any time. The mixture is then stirred for another 30 minutes and salt is then added at the rate of 1 lb. for each gallon of solution. The mixture is stirred for 1 hour and filtered and the residue on the filter is washed with 10% aqueous sodium chloride solution, drained well and then mixed with 4.2 parts of disodium hydrogen phosphate and 7.6 parts of potassium dihydrogen phosphate and dried at 25° C. The product is an orange powder.

When applied to textile materials by the methods described above, yellow shades are obtained possessing very good fastness to severe washing and to light.

If, in the above example, the monoazo compound used is replaced by 43.3 parts of the trisodium salt of the product obtained by coupling diazotised 2-amino-5-sulphobenzoic acid with 1-(3'-aminophenyl)-3-carboxy-5-pyrazolone, a similar product is obtained.

Example 2

A neutral solution in 1400 parts of water of 51.1 parts of the disodium salt of the aminoazo compound obtained by reducing with sodium sulphide the monoazo compound obtained by coupling diazotised 4-nitro-aniline-2-sulphonic acid with 1-(2'-methyl-5'-sulphophenyl)-3-methyl-5-pyrazolone is added gradually in a period of 40 minutes to a suspension formed by pouring a solution of 19.2 parts of cyanuric chloride in 100 parts of acetone into a stirred mixture of 300 parts of water and 300 parts of crushed ice. The temperature of the mixture is kept below 3° C. and after the addition of the solution of aminoazo compound is complete the mixture is stirred for 15 minutes and the product is isolated as described in Example 1.

The product is obtained as an orange powder which dissolves in water to give a yellow solution and when applied to textile materials by the methods described above gives reddish yellow shades having excellent fastness to repeated washing and light.

If, in the above example the aminoazo compound used is replaced by 56.6 parts of the aminoazo compound obtained by reducing with sodium sulphide the monazo product obtained by coupling diazotised 4-nitroaniline-2-sulphonic acid with 1-(2':5'-dichloro-4'-sulphophenyl)-3-methyl-5-pyrazolone, the product obtained is an orange powder which dissolves in water to give a yellow solution.

When applied to textile materials by the methods described above, it gives reddish yellow shades having excellent fastness to repeated washing and light.

Example 3

If instead of the aminoazo compound obtained from 1 - (2' - methyl - 5' - sulphophenyl) - 3 - methyl - 5 - pyrazoline used in Example 2 there is used 49.6 parts of disodium salt of the aminoazo compound similarly obtained from 1-(2'-sulphophenyl)-3-methyl-5-pyrazolone as coupling component; or 54.9 parts of the trisodium salt of the aminoazo compound similarly obtained using 1-(4'-sulphophenyl)-3-carboxy-5-pyrazolone as the coupling component, or 54.6 parts of the disodium salt of the aminoazo compound similarly obtained using 1-(6'-chloro - 4' - sulpho - 2' - methylphenyl) - 3 - methyl - 5-pyrazolone as the coupling component; or 54.6 parts of the disodium salt of the aminoazo compound similarly obtained from 1-(6'-chloro-3'-sulpho-2'-methylphenyl)-3-methyl-5-pyrazolone as coupling component; or 49.7 parts of the disodium salt of the aminoazo compound similarly obtained using 1-(4'-sulphophenyl)-3-methyl-5-pyrazolone as coupling component; then in each case there is formed as a result of the reaction with cyanuric chloride a dyestuff which in the dried state is an orange powder and which dissolves in water to give a reddish yellow solution. Each dyestuff when applied to textile materials by the methods described above gives bright reddish yellow shades having excellent fastness to repeated washing and good to very good fastness to light.

Example 4

A solution of 18.8 parts of cyanuric chloride in 100 parts of acetone is poured into a stirred mixture of 600 parts of water and 600 parts of crushed ice and to the suspension so formed there is added during a period of 40 minutes a solution in 1000 parts of water of 53.1 parts of the disodium salt of the aminoazo compound found by coupling diazotised 5-acetylaminoaniline-2-sulphonic acid with 1-(2'-chloro-5'-sulphophenyl)-3-methyl-5-pyrazolone and hydrolysing the monoazo product in boiling dilute hydrochloric acid. The reaction mixture is stirred for a short period of time keeping the temperature below 5° C. and the acidity which has developed in the reaction medium is neutralised to litmus by careful addition of a solution of sodium carbonate. Sodium chloride is then added at the rate of 10 lbs. for every 10 gallons of reaction mixture and then there is added a solution containing 7 parts of anhydrous disodium hydrogen phosphate and 12.5 parts of anhydrous potassium dihydrogen phosphate in 100 parts of water. The mixture is stirred for another 30 minutes and the residue on the filter is mixed thoroughly with 4.2 parts of anhydrous disodium hydrogen phosphate and 7.6 parts of anhydrous potassium dihydrogen phosphate and then dried at 30° C.

The dyestuff so obtained is a greenish yellow solid which gives greenish yellow solutions in water. When applied to textile materials by the methods described above it yields bright greenish yellow shades which possess excellent fastness to repeated washing and to light.

If in place of the aminoazo compound used in the above example there is used 56.6 parts of the disodium salt of the aminoazo compound obtained in a similar way from 1-(2':5'-dichloro-4'-sulphophenyl)-3-methyl-5-pyrazolone as coupling component; or an equivalent molecular amount of the disodium salt or trisodium salt as the case may be of the aminoazo compound obtained by hydrolysis of the product formed by coupling 5-acetylamino-aniline-2-sulphonic acid with one of the following coupling components:

(a) 1-(4'-sulphophenyl)-3-carboxy-5-pyrazolone,
(b) 1-(2'-methyl-5'-sulphophenyl)-3-methyl-5-pyrazolone,
(c) 1-(6'-chloro-4'-sulpho-2'-methylphenyl)-3-methyl-5-pyrazolone,
(d) 1-(2'-sulphophenyl)-3-methyl-5-pyrazolone, or
(e) 1-(4'-methoxy-2'-sulphophenyl)-3-methyl-5-pyrazolone, then in each case as a result of the reaction with cyanuric chloride there is obtained a dyestuff which gives bright greenish yellow shades on textile materials when applied by the dyeing or printing methods described above. The dyeings and prints so obtained have very good fastness to washing and to light.

What I claim is:

1. Monoazo dyestuffs of the formula:

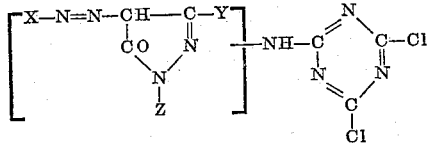

wherein the cyanuric residue is in a position selected from the meta and para positions to the azo group attached to the radical X and the meta and para positions to the nitrogen atom attached to the radical Z; Y stands for a member of the group consisting of methyl, carboethoxy and a carboxylic acid group; X and Z are monocyclic aryl radicals free from hydroxyl substitution; and the molecule contains from two to three solubilizing substituents, these solubilizing substituents being selected from the class consisting of sulphonic acid and carboxylic acid groups, at least two of said solubilizing groups being identical.

2. Monoazo dyestuffs as claimed in claim 1 containing a 3-(3':5'-dichloro-2':4':6'-triazinylamino)-phenylazo grouping.

3. Monoazo dyestuffs as claimed in claim 1 containing a 1-(3'-(3":5"-dichloro-2":4":6"-triazinylamino)-phenyl)-5-pyrazolone grouping which is substituted in the 3-position by a radical selected from the class consisting of methyl, carboethoxy and carboxylic acid group.

4.

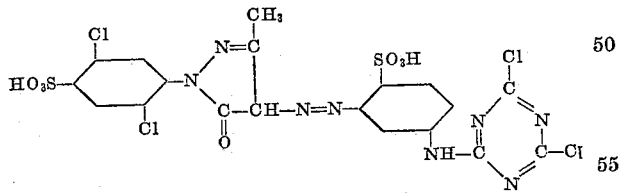

5.

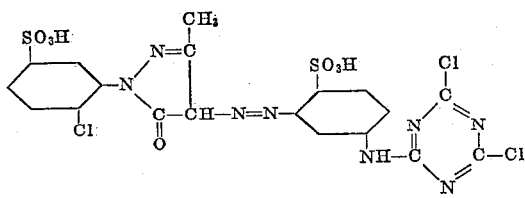

6.

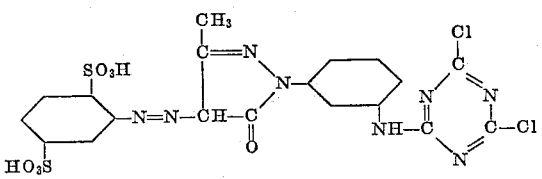

7.

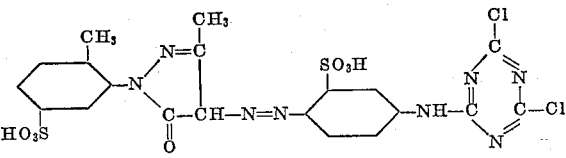

8.

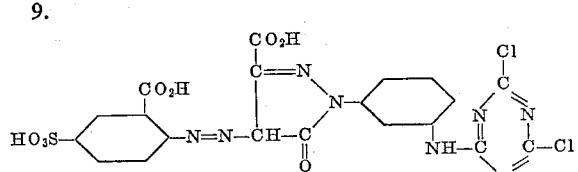

9.

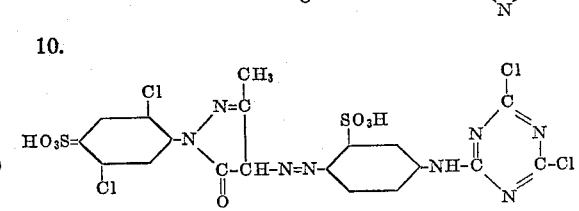

10.

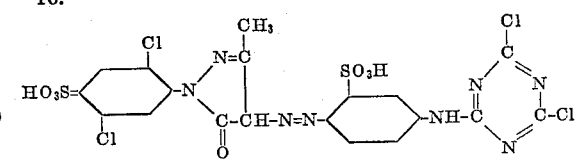

References Cited in the file of this patent

UNITED STATES PATENTS 2,399,066    Schmid et al.    Apr. 23, 1946